(12) United States Patent
Binkle et al.

(10) Patent No.: US 7,384,470 B2
(45) Date of Patent: Jun. 10, 2008

(54) PRODUCTION OF CERAMIC, GLASS CERAMIC AND OTHER MINERAL MATERIALS AND COMPOSITE MATERIALS

(75) Inventors: Olaf Binkle, Kirkel (DE); Ralph Nonninger, Saarbruecken (DE)

(73) Assignee: ItN Nanovation AG, Saarbrucken (DE)

( * ) Notice: Subject to any disclaimer, the term of this patent is extended or adjusted under 35 U.S.C. 154(b) by 55 days.

(21) Appl. No.: 10/513,307

(22) PCT Filed: May 5, 2003

(86) PCT No.: PCT/EP03/04676

§ 371 (c)(1),
(2), (4) Date: Feb. 15, 2005

(87) PCT Pub. No.: WO03/093195

PCT Pub. Date: Nov. 13, 2003

(65) Prior Publication Data

US 2005/0126438 A1    Jun. 16, 2005

(30) Foreign Application Priority Data

May 5, 2002 (DE) ................................ 102 20 086

(51) Int. Cl.
*C09D 1/00* (2006.01)
(52) U.S. Cl. .............................. 106/286.8; 106/287.17; 501/153; 502/60
(58) Field of Classification Search ........... 106/287.17, 106/286.8; 501/153, 113; 502/60
See application file for complete search history.

(56) References Cited

U.S. PATENT DOCUMENTS

| 4,236,931 | A | | 12/1980 | Kiehl et al. |
| 5,217,789 | A | * | 6/1993 | Elliott et al. ................ 428/192 |
| 5,709,786 | A | | 1/1998 | Friese et al. |
| 5,750,193 | A | * | 5/1998 | Nass et al. ............. 427/213.31 |
| 5,905,000 | A | | 5/1999 | Yadav et al. |
| 5,952,040 | A | | 9/1999 | Yadav et al. |
| 6,007,926 | A | | 12/1999 | Provenzano et al. |
| 6,202,471 | B1 | | 3/2001 | Yadav et al. |
| 6,228,904 | B1 | | 5/2001 | Yadav et al. |
| 6,261,511 | B1 | | 7/2001 | Miyake et al. |
| 6,291,070 | B1 | | 9/2001 | Arpac et al. |
| 6,387,560 | B1 | | 5/2002 | Yadav et al. |
| 6,513,362 | B1 | | 2/2003 | Yadav et al. |
| 2002/0055033 | A1 | | 5/2002 | Yadav et al. |
| 2002/0184939 | A1 | | 12/2002 | Yadav et al. |
| 2002/0187387 | A1 | | 12/2002 | Yadav et al. |
| 2002/0188052 | A1 | | 12/2002 | Yadav et al. |
| 2004/0253432 | A1 | * | 12/2004 | Nonninger et al. ...... 428/304.4 |

FOREIGN PATENT DOCUMENTS

| DE | 195 38 667 C2 | 8/1996 |
| DE | 198 49 048 A1 | 4/2000 |
| DE | 199 24 453 A1 | 1/2001 |
| DE | 199 58 973 A1 | 6/2001 |
| DE | 101 27 494 A1 | 3/2003 |
| DE | 101 43 837 A1 | 3/2003 |
| WO | WO 01/14280 A1 | 3/2001 |

OTHER PUBLICATIONS

Burgard, D. et al. "Synthesis and Colloidal Processing of Nanocrystalline (Y2O3-stabalized) ZrO2 Powders By a Surface Free Energy Controlled Process", Materials Research Society Symposium Proceedings, Materials Research Society, vol. 432 pp. 113-120.
Römpp, Lexikon der Chemie, Bd. 3, 10. Aufl., Thieme Verlag, (1997,) S.2153; Kieselsol.

* cited by examiner

*Primary Examiner*—David M Brunsman
(74) *Attorney, Agent, or Firm*—The Nath Law Group; Jerald L. Meyer; Stanley N. Protigal

(57) ABSTRACT

An inorganic binder for the production of ceramic, glass ceramic and other mineral materials and composite materials comprises at least one inorganic compound having a mean particle size of <100 nm and at least one solvent. The inorganic compounds are preferably compounds selected from the group consisting of the chalcogenides, the carbides and/or the nitrides. Further preference is given to the mean particle size being <50 nm, in particular <25 nm. The solvent is, in particular, a polar solvent, especially water.

1 Claim, No Drawings

PRODUCTION OF CERAMIC, GLASS CERAMIC AND OTHER MINERAL MATERIALS AND COMPOSITE MATERIALS

This application is a 371 of PCT/EP03/04676, filed 05 May 2003.

The invention relates to the production of ceramic, glass ceramic and other mineral materials and composite materials, in particular an inorganic binder suitable for such production. In this context, the invention also provides a composition in which this binder is present and the articles and coatings produced using this composition.

In the prior art, both organic binders (e.g. phenolic resins) and inorganic binders (e.g. cement) are utilized for binding a variety of substances in the production of materials. The use of hybrid materials produced on the basis of the sol-gel process as binders is also known.

Organic binders or hybrid materials are used to hold together a desired structure. However, materials which have been bound in this way cannot be used at high temperatures since both the organic binders and the hybrid materials burn and thus lose their strength. In addition, the pyrrolysis products formed when such binders are used are in most cases toxic. If materials are to be bound together so that the resulting composite materials are thermally stable, inorganic binders are therefore used.

Among inorganic binders, a distinction is made between two types, namely binders which require water for setting (e.g. cement, lime and plaster of Paris) and those which require further additives in addition to water for setting (e.g. water glass, magnesia binders, phosphate binders).

The best-known inorganic binders must be cement, lime and plaster of Paris. Mixed with water, these serve as inorganic binding building materials in mortar and concrete production, as fillers and hardening agents. They make it possible to achieve virtually any moldability, which is however maintained for only a limited time, and solidify or cure at low temperatures.

Cement, lime and plaster of Paris are all reactive toward water. After these inorganic materials have been mixed with water, chemical transformations occur and lead to products which are more or less crystalline. Among the setting processes, a distinction is made between three types: setting by hydration, hydraulic setting and setting by carbonate formation. In setting by hydration, the water added is bound and incorporated in molecular form (e.g. $CaSO_4$ is converted into $CaSO_4 * H_2O$); in hydraulic setting, hydrolysis of the starting material occurs (e.g. CaO is converted into $Ca(OH)_2$); and in the case of setting by carbonate formation, carbon dioxide is taken up and chemically bound (e.g. CaO is converted into $Ca(OH)_2$ and in the second step into $CaCO_3$). Pure types of setting are rare in practice and a combination of two or all three types of setting is usually present. It also needs to be stated that the setting of these inorganic binders is always exothermic.

In addition to cement, lime and plaster of Paris, there is also a group of inorganic binders which require additives in addition to water for setting. The curing of magnesia binders (MgO) is based on the formation of sparingly soluble basic magnesium salt hydrates as a result of the addition of magnesium chloride or magnesium sulfate solutions. Phosphate binders, on the other hand, cure as a result of mixing of $Al(OH)_3$ with phosphoric acid ($H_3PO_4$) or as a result of mixing of $Al(OH)_3$ with an $Al(H_2PO_4)_3$ solution to form tertiary aluminum phosphate. In the case of water glass (aqueous solution of $Na_2O$ and $SiO_2$), setting occurs as a result of the addition of additives such as esters of organic acids, acids in general or addition of oxides or hydroxides. In the case of setting after addition of oxides (e.g. ZnO) or hydroxides, formation of sparingly soluble silicate hydrates (e.g. $ZnSiO_3$) occurs. In the last three cases discussed, water does not lead directly to a chemical reaction but the presence of water as reaction medium is a basic requirement for the chemical reactions which take place.

The application of mineral layers, especially ceramic layers, to metal, glass, enamel or ceramic substrates or the production of ceramics usually requires the use of a binder, since the mineral starting materials, in particular the ceramic starting materials, are in powder form. Use is here made virtually exclusively of organic binders which give the layer or the shaped body sufficient strength prior to firing (sintering). During the sintering process, the organic binders are decomposed pyrolytically and leave the shaped ceramic body or the ceramic layer as gaseous degradation products. The burning-out of the organic binders causes shrinkage of the ceramic layer or the shaped body during the sintering process, and this in turn leads to stresses and cracks in the layer or in the shaped body.

It would therefore be ideal to carry out the production of a shaped ceramic body using an inorganic binder which remains in the layer or in the shaped body during the sintering process, so that the shrinkage remains small and stresses do not result.

However, the inorganic binders discussed in the prior art do not satisfy the requirements here. All inorganic binders discussed display excessively fast and consequently insufficiently controlled reaction rates, so that uniform application of a layer, e.g. in an industrial spray process, or customary ceramic shaping methods such as tape casting, extrusion or injection molding are virtually impossible. Furthermore, problems are caused by the heat of reaction evolved in the process and the fact that ceramic layers/shaped bodies bound in this way would undergo after-condensation under the action of heat, which would likewise lead to stress cracks. There are also numerous applications which do not allow water as solvent or as reactant.

It is accordingly an object of the invention to eliminate the disadvantages known from the prior art or at least to avoid them to a substantial extent. In particular, the invention should provide an inorganic binder which has the most important advantages of an organic binder. The inorganic binder should thus be chemically neutral in the production of the ceramic, glass ceramic or other mineral materials/composite materials. It should nevertheless join or adhesively bond the particles/powder particles/fibers and the like which are to be joined to one another. The binder should function in this way independently of external activation, for example not by addition of water as in the setting of cement, but be an intrinsic property of the binder. The inorganic binder should remain in the material during the curing/strengthening of the material, in particular during a sintering or firing process, and the shrinkage occurring during sintering/firing should in this way be kept as small as possible so that stresses and cracks are avoided.

This object is achieved by the inorganic binder having the features of an inorganic binder for the production of ceramic, glass ceramic and other mineral materials and composite materials, in which the binder comprises at least one inorganic compound having a mean particle size of <100 nm and at least one solvent. The object is further achieved with a composition in which the solvent is present in the binder in an amount, based on the total weight of the binder, of from 50% by weight to 80% by weight. Preferred embodiments of the binder of the invention and the composition of the invention are as set forth in the claims.

The inorganic binder according to the invention is intended for the production of ceramic, glass ceramic and other mineral materials and composite materials and comprises at least one inorganic compound having a mean particle size of <100 nm and at least one solvent.

To elaborate, the following may be said.

A feature critical to the function of the binder of the invention is the presence of nanosize inorganic compounds. The term nanosize particles or powders is usually applied to particles or powders having a mean particle size well in the submicron range. Here, this particle size applies to the individual particles/powder particles in the nonagglomerated state. Owing to their high surface energies, nanosize particles frequently clump together and in this way form agglomerates or aggregates which have a particle size which is misleadingly larger than the actual size of the individual particles. The sizes indicated in the description of the invention accordingly relate, as far as possible, to the mean particle size of an individual particle, which can in this context also be referred to as a "primary particle".

For the advantages according to the invention to be present, the particle size of the inorganic compounds used according to the invention, which are usually used in powder form, should, as mentioned, be far in the submicron range. Accordingly, the mean particle size should usually be <200 nm, in particular <100 nm as defined in claim 1.

The terms "ceramic", "glass ceramic", "mineral" and "materials" and "composite materials" used in claim 1 are known to those skilled in the art and should be interpreted very broadly. Inorganic binders according to the invention are suitable and advantageous for the production of very many inorganic materials/composite materials. Ceramics are, as is known, materials and products which are shaped from a powder using the methods of ceramic technology and are subsequently converted into their final form by means of a sintering process or firing process. Glass ceramics are materials produced from glasses by controlled crystallization, while the term mineral materials is the generic term for such inorganic materials. This will be explained further in the following with reference to the zeolites. In any case, the invention is intended to extend to the production of all inorganic materials which are formed from a raw composition with the aid of a binder, in particular by strengthening/curing at temperatures above 200° C.

In preferred embodiments of the inorganic binder, the mean particle sizes of the inorganic compounds used are far below 100 nm. Emphasis is here placed on particle sizes of from 2 nm to 50 nm, with particle sizes of from 2 nm to 25 nm being more preferred.

The nanosize powder particles used for the binder of the invention are, in particular, nanosize chalcogenide, carbide or nitride powders. The chalcogenides are, as is known, binary compounds in which the elements oxygen, sulfur, selenium and tellurium occur as electronegative component. The chalcogenide powders can thus be oxide, sulfide, selenide or telluride powders. Nanosize oxide powders are preferred. It is possible to use, in particular, all powders which are customarily used for powder sintering. Examples are (anhydrous or hydrated) oxides such as $ZnO$, $CeO_2$, $SnO_2$, $Al_2O_3$, $CdO$, $SiO_2$, $TiO_2$, $In_2O_3$, $ZrO_2$, yttrium-stabilized $ZrO_2$, $Al_2O_3$, $La_2O_3$, $Fe_2O_3$, $Fe_3$, $O_4$, $Cu_2O$, $Ta_2O_5$, $Nb_2O_5$, $V_2O_5$, $MoO_3$ or $WO_3$, and also phosphates, silicates, zirconates, aluminates and stannates, sulfides such as $CdS$, $ZnS$, $PbS$ and $Ag_2S$, selenides such as $GaSe$, $CdSe$ and $ZnSe$, tellurides such as $ZnTe$ or $CdTe$, carbides such as $WC$, $CdC_2$ or $SiC$, nitrides such as $BN$, $AlN$, $Si_3N_4$ and $Ti_3N_4$, corresponding mixed oxides such as metal-tin oxides, e.g. indium-tin oxide (ITO), antimony-tin oxide, fluorine-doped tin oxide and Zn-doped $Al_2O_3$, luminescent pigments comprising Y- or Eu-containing compounds, and mixed oxides having a perovskite structure, e.g. $BaTiO_3$, $PbTiO_3$ and lead zirconate titanate (PZT). It is also possible to use mixtures of the powder particles indicated.

The inorganic binder of the invention preferably comprises nanosize particles which are composed of a chalcogenide, preferably oxide, oxide hydrate, nitride or carbide of Zr, Al, B, Zn, Si, Cd, Ti, Ce, Fe, Sn, In, La, Cu, Ta, Nb, V, Mo or W, particularly preferably Zr, Al, Ti, Fe and Si. Particular preference is given to using oxides. Preferred nanoparticles are particles of aluminum oxide, boehmite, zirconium oxide, yttrium-stabilized zirconium oxide, iron oxide and titanium dioxide or mixtures of such nanoparticles.

The amount of solvent present in the binder of the invention is in principle not critical and can be varied according to the use to which the binder is put. However, preference is given to the solvent component being present in the binder in an amount, based on the total weight of the binder, of from 40% by weight to 95% by weight. Within this range, amounts of from 50% by weight to 80% by weight are preferred. It is in principle possible to use a variety of solvents, including, for example, aliphatics and oils. However, it is advantageous in many cases to use polar solvents, in particular esters, alcohols, diols, glycols and the like. If alcohols are used, preference is given to $C_1$-$C_5$-alkanols, in particular ethanol. A particularly preferred solvent is water, which may also be preferred in admixture with alcohols. Aqueous binder systems are particularly simple to handle, especially because of their low toxicity.

The binder of the invention may, if appropriate, further comprise additional additives. These are, in particular, additives which aid distribution of the inorganic compound in the binder system and/or inhibit agglomeration of the individual nanoparticles. Such additives can be, for example, anionic or cationic surfactants.

The composition or starting substance of the invention for the production of ceramic, glass ceramic and other mineral materials and composite materials comprises at least one inorganic binder according to the invention. It is this binder which distinguishes the composition from the prior art.

The amount of binder present in the composition is in principle not critical according to the invention. This amount is selected so that the effect provided according to the invention is obtained. For cost reasons, the amount of binder will usually be kept as small as possible. Preferred amounts of binder in the composition are from 1% by weight to 40% by weight, in particular from 5% by weight to 20% by weight. If the amount is based on the nanosize inorganic compound, this is preferably present in the composition in amounts of from 1.5% by weight to 15% by weight, more preferably from 5% by weight to 10% by weight.

Depending on the composition of the binder and depending on the other components of the composition, the consistency of the composition can be varied within wide limits. Thus, the composition can be in the form of a low-viscosity suspension, in the form of a relatively high-viscosity suspension or in the form of a slip through to the form of a comparatively firm, paste-like mass. Thus, when the composition is to be applied as a coating, a low-viscosity suspension which can then be, for example, painted on, sprayed on or even applied by dipping or flooding will frequently be selected. When shaped bodies are to be produced from the composition, the composition will tend to be in the form of a possibly paste-like mass which can then be cast, extruded or the like.

Apart from the binder, the composition of the invention comprises first and foremost those constituents (then bound by the binder) of which the material or composite material to be produced is to be composed. These constituents can advantageously be all customary inorganic particles or fibers as are known for the production of ceramics and glass ceramics. These customary "ceramic powders" as further constituents of the composition then generally preferably have a larger particle size than the nanosize particles in the binder. These particles will frequently be in the micron range, in particular in the range from 1 µm to 500 µm. However, it is likewise preferred according to the invention for submicron particles to be present in the composition in addition to the nanosize particles of the binder (<100 nm), for example powder particles having particle sizes in the range from 500 nm to 1000 nm (1 µm).

The inorganic particles or fibers for the production of ceramics and glass ceramics are preferably the abovementioned chalcogenides, carbides and/or nitrides, with the use of oxides also being preferred here. The corresponding information in the previous description relating to these compounds is hereby expressly incorporated by reference.

Furthermore, compositions in which zeolites are used in addition to the binder of the invention also deserve particular mention for the production of other mineral materials and composite materials. Zeolites are, as is known, a group of water-containing minerals based on aluminosilicates which are known to those skilled in the art. Zeolites have voids in their interior, which predestines them for various fields of use. Thus, zeolites are used as molecular sieves or in ion exchangers. The advantages of zeolite-based materials produced according to the invention will be explained in more detail in the following.

Finally, the compositions of the invention can in all cases further comprise additional customary additives which, for example, influence the properties of the composition itself (addition of dispersants, surfactants and the like) or its processability (e.g. adhesion promoters in the case of coating materials). If desired, at least one further organic binder which is removed again from the composition during the strengthening carried out at relatively high temperatures, i.e. is burned out, can be added to the composition of the invention in addition to the inorganic binder of the invention.

The invention further provides the inorganic shaped bodies and the inorganic coatings which are or can be produced with the aid of the binder of the invention or from the composition of the invention. In this context, the invention also encompasses all those articles which are provided (in their entirety or partly) with a novel coating of this type.

At this point, the function of the nanoparticles present in the binder of the invention will be explained.

The nanoparticles used as inorganic binder have very large specific surface areas which preferably bear reactive hydroxyl groups. These surface groups are able, even at room temperature, i.e. before the sintering or firing process, to crosslink with the surface groups of the materials to be bound (e.g. ceramic powders, fibers, etc.). In this way, strengthening of the unfired (green) layers/shaped bodies analogous to that effected by organic binders is possible. Owing to the high radii of curvature of nanoparticles, nanoparticles also have extremely high surface energies. Even at temperatures above 200° C., preferably above 300° C., it is found that these surface energies lead to material transport (diffusion) from the nanoparticles to the points of contact of the (usually coarser) materials to be bound. The bound, coarser powder particles have significantly lower surface energies and therefore do not yet sinter at this point in time, i.e. they also do not yet shrink. The material transport triggered by the nanoparticles leads to sintering of the bound particles without mass transfer occurring in the bound coarser particles. This form of mass transfer is completely new, since the nanoparticles used as binder dissolve in a manner analogous to sacrificial materials, i.e. lose their original shape and in the process join/sinter the coarser powder particles to one another. This shrinkage-free sintering leads firstly to a porous (frequently highly porous) layer having an open-pored structure. For the present purposes, the term open-pored structure means that the pores present in the layers/shaped bodies are accessible from the outside, i.e. are not closed to the outside. The open porosity thus extends at least partly over the layers/shaped bodies, but does not necessarily extend right through the entire layers/shaped bodies. If this were the case, the corresponding shaped body would, for example, be able to be used as a filter, in particular as a ceramic filter. However, the porous layer can be sintered to close to the theoretical density or to the theoretical density when the temperature is increased further. Accordingly, the porosity can be set by selection of the temperatures when performing the invention. As long as the firing temperature employed is below that at which the coarser powder particles sinter, viz. display mass transfer, the strengthening occurs without shrinkage and stresses.

It can be seen from what has been said above that the inorganic shaped bodies of the invention and the inorganic coatings of the invention can as a matter of choice be made more or less porous. If the materials/composite materials, in particular the ceramic and glass ceramic materials/composite materials, are strengthened or sintered at comparatively low temperatures and/or for comparatively short times, shaped bodies and coatings having a relatively high porosity are obtained. If strengthening or sintering is carried out at higher temperatures and/or for longer times, materials/composite materials having close to the theoretical density or the theoretical density are obtained. Under appropriate strengthening/sintering conditions, shrinkage-free and stress-free shaped bodies and coatings which are consequently largely free of cracks can be obtained. This clearly distinguishes the shaped bodies and coatings of the invention from the prior art. Such shaped bodies and coatings are also particularly stable to high temperatures.

The ceramic and glass ceramic materials and composite materials of the invention are particularly suitable for a wide variety of applications. Particular mention may here be made of their possible use as insulation materials, as filters for gas and liquid filtration, as scratch-resistant layers, as diesel particulate catalysts and as high-porosity support materials for catalytically active substances.

When the materials and composite materials of the invention are to be applied as coatings to articles, possible substrate materials are, in particular, metals, ceramics, glass ceramics, glass and enamel.

As stated above, the binders of the invention can also be used for binding zeolites. It is in this way possible to produce both zeolite layers or zeolite coatings and shaped zeolite bodies.

In such materials produced using zeolites, the pores of the zeolites are surprisingly not filled. Thus, both the voids of the zeolites and the large (internal) surface area of the zeolites are retained. In the case of zeolite layers, strengthening of the layers can be carried out even at comparatively low temperatures, in particular in the range from 500° C. to 600° C., over short periods of time, e.g. within a few seconds. The layers obtained have excellent thermal shock resistance and survive repeated heating from room temperature to relatively high temperatures, for example 600° C., within short periods of time, for example within only 3 seconds, without problems.

It is possible to obtain high layer thicknesses up to shaped bodies having thick walls. Usually preferred layer thicknesses are in the range from 1 μm to 300 μm. If such layers are applied to flexible substrates, in particular metallic substrates, the coated substrates can be bent/deformed without the applied zeolite layers flaking off. Fine, open structures (e.g. thin wire meshes or thin metal platelets) can readily be coated, too.

Preferred application areas for zeolite layers and shaped zeolite bodies are, for example, catalyst layers or shaped catalyst bodies for gas-phase reactions, as filters for the separation of gases, the possible use as sensors, in particular gas sensors, the possible use as adsorption layers (e.g. to remove pollutants or for gas adsorption) and the possible use as ion exchangers.

Finally, the invention encompasses the use of inorganic compounds having a mean particle size of <100 nm as binder constituents for the production of ceramic, glass ceramic and other mineral materials and composite materials. This use is disclosed by the previous description. Accordingly, the corresponding information given above is expressly incorporated by reference.

The stated advantages and further advantages of the invention can be derived from the description of the following examples in conjunction with the subordinate claims. The individual features of the invention can be realized either alone or in combination with one another.

EXAMPLES

Example 1

40 g of an aluminum oxide powder (Ceralox APA 0.5 (corresponding to a particle size of 0.5 μm) from Condea-Chemie GmbH, Germany) are slurried with 10 g of water. 10 g of an inorganic binder solution (45% by weight of nano-size zirconium oxide (mean particle size <50 nm) in 55% by weight of water) are added to the suspension obtained in this way. 0.9 g of commercially available organic binder (PVA, polyvinyl alcohol) are then mixed in. This gives a composition according to the invention in the form of a suspension. The viscosity of this suspension can be adjusted as desired by addition of preferably small amounts of water and/or nitric acid or by alteration of the amount of organic binder added. These suspensions can subsequently be applied to metal, ceramic, glass ceramic, glass and enamel substrates by means of a spraying process to produce ceramic layers. Strengthening is carried out by sintering/firing at temperatures above 500° C. The porosity of the ceramic layers obtained can also be set by selection of the final temperature and/or the duration of the sintering/firing process.

Example 2

A further low-viscosity ceramic suspension is prepared as described in example 1. Shaped ceramic bodies are obtained from this suspension by slip casting. The green body obtained is firstly dried at 70° C. in a drying oven and subsequently sintered/fired at above 500° C. Here too, porosities of the shaped body obtained can be varied in a comparable way by means of the temperature level and time for which it is maintained.

Example 3

A sol is prepared from 1.63 g of a boehmite AlOOH (product Disperal P3 from Sasol Ltd.) and 7.43 g of water by stirring. 1.64 g of Ceralox powder (see example 1) are added to this sol in a bead mill and the mixture is milled for a period of 10 minutes. Finally, 4.5 g of a zeolite (product Fe-MSM-1S from Alsi-Pentha-Zeolith GmbH, Germany) and 1.5 g of iron oxide ($Fe_2O_3$) from Riedel-de Haen are added as filler and colorant.

The suspension obtained in this way is sprayed as a coating on a ceramic support, dried at room temperature and subsequently fired at 600° C.

The invention claimed is:

1. A composition for the production of ceramic, glass ceramic and other mineral materials and composite materials, wherein the composition comprises a binder comprising at least one inorganic compound having a mean particle size of <100 nm and at least one suspension medium, and wherein the composition, in addition to the binder, comprises at least one zeolite.

* * * * *